United States Patent
Hiyoshi et al.

(10) Patent No.: US 10,400,666 B2
(45) Date of Patent: Sep. 3, 2019

(54) VARIABLE COMPRESSION RATIO MECHANISM FOR INTERNAL COMBUSTION ENGINE

(71) Applicants: NiSSAN MOTOR CO., LTD., Yokohama-shi, Kanagawa (JP); HARMONIC DRIVE SYSTEMS INC., Shinagawa-ku, Tokyo (JP); HITACHI AUTOMOTIVE SYSTEMS, LTD., Hitachinaka-shi, Ibaraki (JP)

(72) Inventors: Ryosuke Hiyoshi, Kanagawa (JP); Yoshiaki Tanaka, Kanagawa (JP); Yoshihide Kiyosawa, Azumino (JP); Jun Handa, Azumino (JP); Kishiro Nagai, Atsugi (JP); Junichiro Onigata, Atsugi (JP); Yoshihiko Yamada, Fujisawa (JP)

(73) Assignees: NISSAN MOTOR CO., LTD., Yokohama-shi (JP); HARMONIC DRIVE SYSTEMS INC., Tokyo (JP); HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 0 days.

(21) Appl. No.: 15/578,432

(22) PCT Filed: Apr. 22, 2016

(86) PCT No.: PCT/JP2016/062729
§ 371 (c)(1),
(2) Date: Nov. 30, 2017

(87) PCT Pub. No.: WO2016/194510
PCT Pub. Date: Dec. 8, 2016

(65) Prior Publication Data
US 2018/0163622 A1 Jun. 14, 2018

(30) Foreign Application Priority Data
Jun. 2, 2015 (JP) .................................. 2015-111812

(51) Int. Cl.
*F02B 75/04* (2006.01)
*F02B 75/32* (2006.01)
(Continued)

(52) U.S. Cl.
CPC ............ *F02B 75/045* (2013.01); *F02B 75/04* (2013.01); *F02B 75/32* (2013.01); *F02D 15/02* (2013.01);
(Continued)

(58) Field of Classification Search
CPC ...... F02B 75/045; F02B 75/044; F02B 75/04; F02B 75/32; F16H 1/32; F16H 1/28;
(Continued)

(56) References Cited

U.S. PATENT DOCUMENTS 4,917,058 A * 4/1990 Nelson ...................... F01L 1/08
123/184.54
4,974,470 A * 12/1990 Ishikawa ............... F16H 49/001
74/640
(Continued)

FOREIGN PATENT DOCUMENTS

JP    S60-184750 A    9/1985
JP    S60-241550 A    11/1985
(Continued)

OTHER PUBLICATIONS

U.S. Appl. No. 15/578,506, filed Nov. 30, 2017, Nissan Motor Co., Ltd.
(Continued)

*Primary Examiner* — Grant Moubry
(74) *Attorney, Agent, or Firm* — Foley & Lardner LLP

(57) ABSTRACT

A variable compression ratio mechanism for an internal combustion engine includes a gear reducer that varies an engine compression ratio. The gear reducer includes an input-side member connected to a rotation shaft of the
(Continued)

actuator; an output-side member that transmits a reduced rotation of the actuator to the control shaft; a fixed member fixed to a housing of the actuator; and an intermediate member that transmits torque from the input-side member to the output-side member and the fixed member, and has a first gear portion engaged with the fixed member and a second gear portion engaged with the output-side member. A ratio of a number of teeth of the fixed gear portion to a number of teeth of the first gear portion is higher than a ratio of a number of teeth of the output-side gear portion to a number of teeth of the second gear portion.

6 Claims, 4 Drawing Sheets

(51) Int. Cl.
*F02D 15/02* (2006.01)
*F16H 1/28* (2006.01)
*F16H 1/32* (2006.01)

(52) U.S. Cl.
CPC ................. *F16H 1/28* (2013.01); *F16H 1/32* (2013.01); *F16H 2001/323* (2013.01)

(58) Field of Classification Search
CPC .. F16H 49/001; F16H 2001/323; F02D 15/00; F02D 15/02
See application file for complete search history.

(56) References Cited

U.S. PATENT DOCUMENTS

| | | | | |
|---|---|---|---|---|
| 9,360,098 B2 * | 6/2016 | Roopnarine | ........... | F16H 49/001 |
| 9,476,354 B2 * | 10/2016 | Hiyoshi | ................ | F02B 75/045 |
| 9,476,366 B2 * | 10/2016 | Tanaka | .................. | F02B 75/048 |
| 9,482,161 B2 * | 11/2016 | Nagai | .................... | F02B 75/045 |
| 2002/0020368 A1 | 2/2002 | Fujimoto et al. | | |
| 2015/0114174 A1 | 4/2015 | Roopnarine | | |
| 2015/0204251 A1 | 7/2015 | Tanaka et al. | | |
| 2015/0292400 A1 | 10/2015 | Hiyoshi et al. | | |
| 2016/0195176 A1 * | 7/2016 | Zwahr | ..................... | F02B 75/04 475/347 |
| 2017/0254260 A1 * | 9/2017 | Yamada | .................. | F02B 75/04 |

FOREIGN PATENT DOCUMENTS

| | | | |
|---|---|---|---|
| JP | S62-200056 A | 9/1987 | |
| JP | 63-145842 A | 6/1988 | |
| JP | 2002-047955 A | 2/2002 | |
| JP | 2006-112475 A | 4/2006 | |
| JP | 2006-112476 A | 4/2006 | |
| JP | 2006-283876 A | 10/2006 | |
| JP | 2009-41519 A | 2/2009 | |
| JP | 2008-275039 A | 11/2009 | |
| JP | 2010-151088 A | 7/2010 | |
| JP | 2011-21729 A | 2/2011 | |
| JP | 2012251446 A * | 12/2012 | ............ F02D 15/02 |
| JP | 2013-181636 A | 9/2013 | |
| JP | 2014-199119 A | 10/2014 | |
| SU | 667732 A1 | 6/1979 | |
| SU | 879101 A1 | 11/1981 | |
| SU | 934083 A1 | 6/1982 | |
| WO | WO 2014-027497 | 2/2014 | |
| WO | WO 2014-046049 | 3/2014 | |
| WO | WO 2014/10917 A1 | 7/2014 | |

OTHER PUBLICATIONS

USPTO Office Action, U.S. Appl. No. 15/578,506, dated Oct. 1, 2018, 14 pages.

Uspto Notice of Allowance, 15/578,506 (023971-1003), Apr. 25, 2019, 8 pages.

* cited by examiner

VARIABLE COMPRESSION RATIO MECHANISM FOR INTERNAL COMBUSTION ENGINE

FIELD OF THE INVENTION

The present invention relates to a variable compression ratio mechanism for an internal combustion engine.

BACKGROUND ART

There is conventionally known a variable compression ratio mechanism for an internal combustion engine, which uses a double-link piston-crank mechanism capable of varying an engine compression ratio of the internal combustion engine by changing a rotational position of a control shaft upon transmission of a rotational drive force of an actuator to the control shaft through a gear reducer.

For example, Patent Documents 1 and 2 each disclose a variable compression ratio mechanism having a gear reducer designed on the differential gear principle so as to ensure not only a high reduction ratio but also a large gear module size and thereby not to cause a strength deterioration and surface wear of gear teeth due to a decrease of gear module size.

The gear reducer of the above variable compression ratio mechanism is however required to achieve a light weight, high durability and low noise/vibration characteristics, while establishing a layout within a limited vehicle space, and is still in need of further improvements.

PRIOR ART DOCUMENTS

Patent Document

Patent Document 1: International Publication No. WO 2014/109179
Patent Document 2: International Publication No. WO 2014/27497

SUMMARY OF THE INVENTION

According to the present invention, there is provided a variable compression ratio mechanism for an internal combustion engine, comprising a gear reducer that reduces and transmits rotation of an actuator as a drive torque to a control shaft so as to change a rotational position of the control shaft and thereby vary an engine compression ratio of the internal combustion engine, wherein the gear reducer comprises: an input-side member connected to a rotation shaft of the actuator; an output-side member that transmits the reduced rotation of the actuator to the control shaft; a fixed member fixed to a housing of the actuator; and an intermediate member that transmits torque from the input-side member to the output-side member and the fixed member, wherein the intermediate member has a first gear portion brought into engagement with a fixed gear portion of the fixed member and a second gear portion brought into engagement with an output-side gear portion of the output-side member, and wherein a ratio of the number of teeth of the fixed gear portion to the number of teeth of the first gear portion is set higher than a ratio of the number of teeth of the output-side gear portion to the number of teeth of the second gear portion.

In the present invention, the gear reducer allows an increased number of gear teeth to be engaged between the output-side gear portion of the second internal gear member and the second gear portion of the intermediate member. It is therefore possible to reduce a load per gear tooth, distribute stress in the engagement part between the output-side gear portion and the second gear portion and suppress breakage and surface wear of the gear teeth caused by interference with the counterpart gear teeth.

DESCRIPTION OF EMBODIMENTS

Hereinafter, exemplary embodiments of the present invention will be described below with reference to the drawings.

Figure 1:
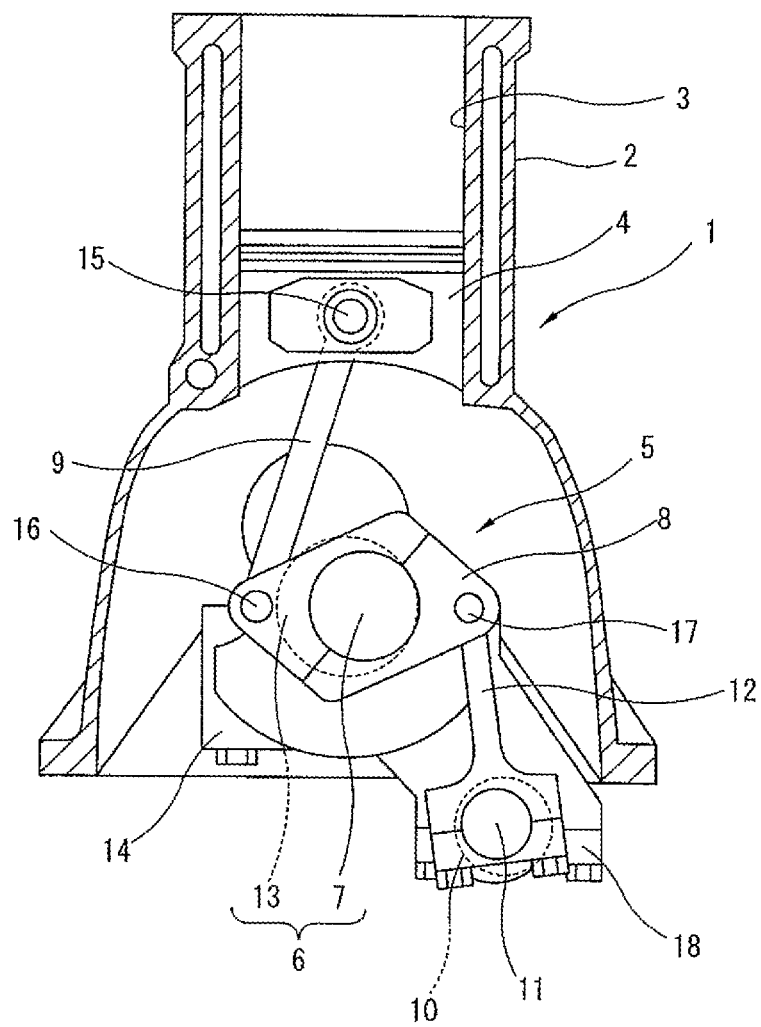
FIG. 1 is a schematic view showing the structure of a variable compression ratio mechanism for an internal combustion engine to which the present invention is applicable.

FIG. 1 is a schematic view showing the structure of an internal combustion engine 1 according to a first embodiment of the present invention.

The internal combustion engine 1 has a variable compression ratio mechanism 5 capable of varying an engine compression ratio by changing a top dead center position of a piston 4 reciprocating in a cylinder 3 of a cylinder block 2.

The variable compression ratio mechanism 5 is constituted by a double-link piston crank mechanism in which the piston 4 and a crankpin 7 of a crankshaft 6 are coupled by a plurality of links, and more specifically, includes: a lower link 8 rotatably mounted on the crankpin 7; an upper link 9 connecting the lower link 8 to the piston 4; a control shaft 10 provided with an eccentric shaft part 11; and a control link 12 connecting the eccentric shaft part 11 to the lower link 8.

The crankshaft 6 is provided with a plurality of journals 13 and crankpins 7. The journals 13 are rotatably supported between the cylinder block 2 and a crank bearing bracket 14.

The upper link 9 has one end rotatably mounted to a piston pin 15 and the other end rotatably connected to the lower link 8 by a first connecting pin 16. The control link 12 has one end rotatably connected to the lower link 8 by a second connecting pin 17 and the other end rotatably mounted to the eccentric shaft part 11 of the control shaft 10.

The control shaft 10 is arranged in parallel to the crankshaft 6 and is rotatably supported on the cylinder block 2 at a location between the crank bearing bracket 14 and a control shaft bearing bracket 18.

An electric motor 21 is connected to the control shaft 10 through the after-mentioned wave gear reducer 22 (see FIG. 2) so as to rotate and drive the control shaft 10 and thereby control a rotational position of the control shaft 10. Herein, the electric motor 21 corresponds to an actuator operated under a command signal from a control unit (not shown).

The position of the eccentric shaft part 11, which serves as a swing center of the control link 12, is changed when the rotational position of the control shaft 10 is shifted by the electric motor 21. With this positional change, the orientation of the lower link 8 is changed. As a consequence, the compression ratio is continuously varied with changes in the piston motion (stroke characteristics) of the piston 4, i.e., changes in the top and bottom dead center positions of the piston 4.

Figure 2:
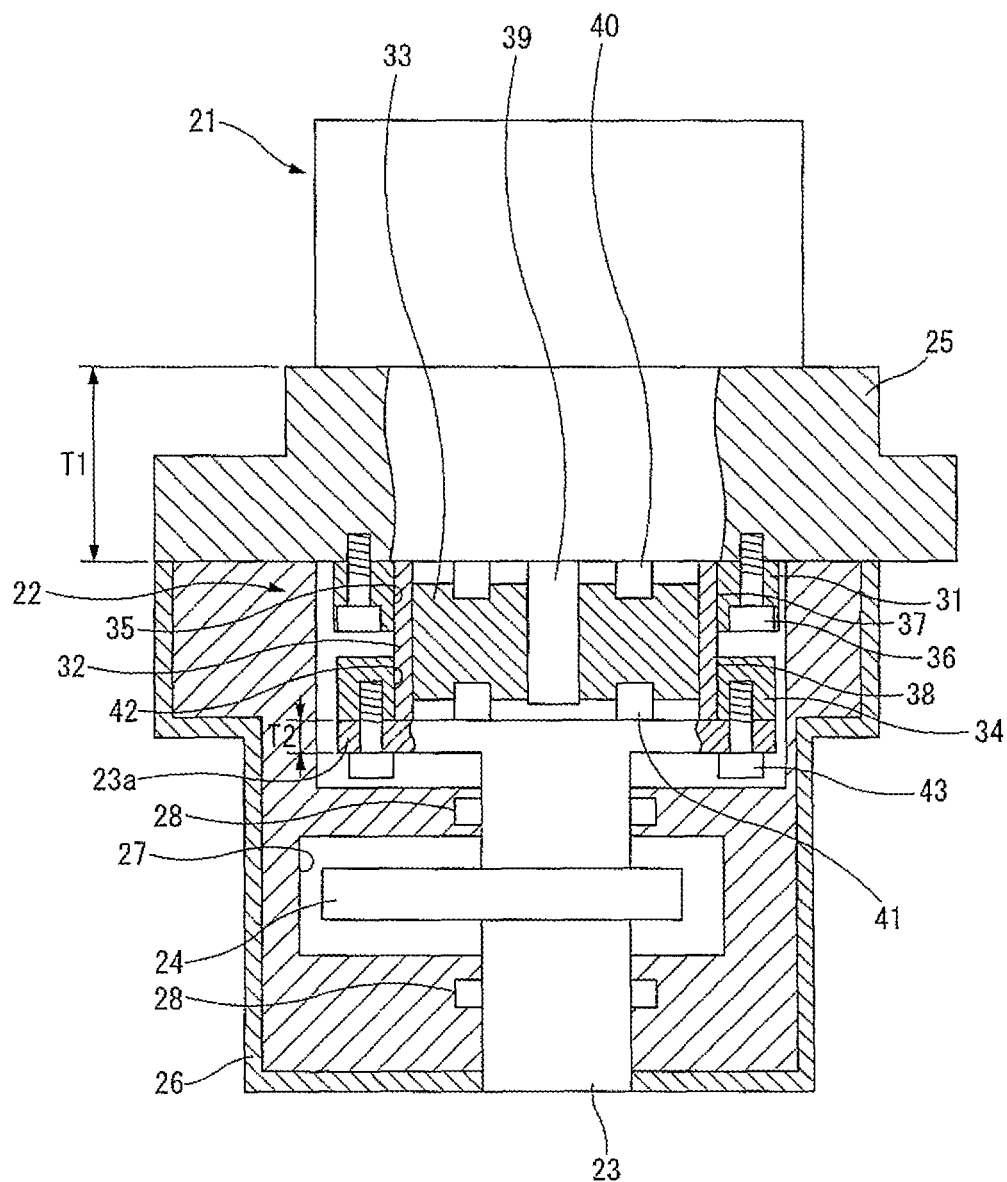
FIG. 2 is a cross-sectional view of a gear reducer of the variable compression ratio mechanism according to a first embodiment of the present invention.
Figure 3:
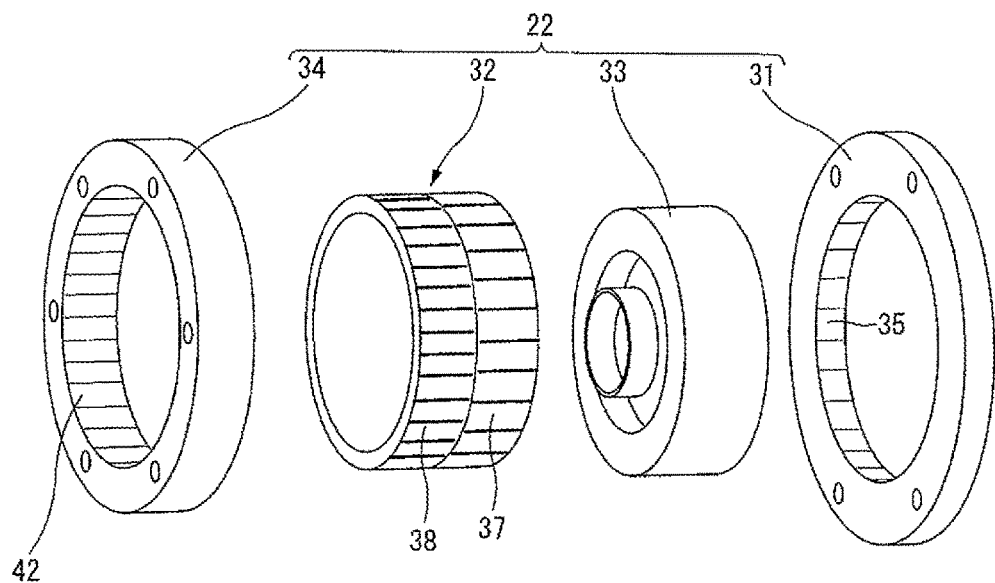
FIG. 3 is an exploded perspective view of the gear reducer of the variable compression ratio mechanism according to the first embodiment of the present invention.

The rotation of the electric motor 21 is transmitted to an output shaft 23, which is made of iron, through the wave gear reducer 22 as shown in FIGS. 2 and 3.

An output shaft-side arm 24 is fixed to the output shaft 23 so as to extend in a radial direction of the output shaft. A control shaft-side arm (not shown) is fixed to the control shaft 10 so as to extend in a radial direction of the control shaft. A link member (not shown) is rotatably coupled at one end thereof to the output shaft-side arm 24 and at the other end thereof to the control shaft-side arm. Thus, the rotation of the output shaft 23 is converted to a translational movement of the link member and transmitted as a drive torque (rotational drive torque) to the control shaft 10.

The electric motor 21, the wave gear reducer 22 and the output shaft 23 are accommodated in a space defined by a motor cover 25, which is made of an aluminum alloy as a housing of the electric motor 21, and a bottomed-cylindrical casing member 26. In FIG. 2, reference numeral 27 denotes an open window portion through which the output shaft-side arm 24 passes; and reference numeral 28 denotes an output shaft support bearing on which the output shaft 23 is rotatably supported in the casing member 26.

The wave gear reducer 22 generally includes: a first internal gear member 31 made of iron as a fixed member; an external gear member 32 made of iron and arranged concentrically inside the first internal gear member 31 as an intermediate member; a wave generator 33 made of iron in an oval outer shape and arranged inside the external gear member 32; and a second internal gear member 34 as an output-side member made of iron in an annular ring shape. The inner and outer diameters of the first internal gear member 31 are substantially the same as those of the second internal gear member 34.

The first internal gear member 31 has an annular ring shape with a fixed gear portion 35 formed on an inner circumferential side thereof. The first internal gear member 31 is fixed to the motor cover 25 by a plurality of first fastening bolts 36. In the first embodiment, the first internal gear member 31 is fixed to the motor cover 25 by four first fastening bolts 36.

The external gear member 32 has a cylindrical shape with first and second gear portions 37 and 38 formed side by side on an outer circumferential side thereof and brought into engagement with the fixed gear portion 35 of the first internal gear member 31 and the after-mentioned output-side gear portion 42 of the second internal gear member 34, respectively. The external gear member 32 is radially elastically deformed according to the oval shape of the wave generator 33 inserted therein so as to engage with the first and second internal gear members 31 and 34 at two locations in a major axis direction of the oval shape.

The wave generator 33 has a center portion fixed to a rotation shaft 39 of the electric motor 21. A ball bearing (not shown) is disposed between the external gear member 32 and the wave generator 33 so as to allow rotation of the external gear member 32 relative to the wave generator 33.

In FIG. 2, reference numerals 40 and 41 denote ball bearings that receive a thrust load and a radial load from the wave generator 33. For example, one of these bearings is adapted as a radial bearing; and the other is adapted as a thrust bearing.

The second internal gear member 34 has an annular ring shape with the output-side gear portion 42 formed on an inner circumferential side thereof. The second internal gear member 34 is fixed to a flange part 23a, which is made of iron on an end portion of the output shaft 23, by a plurality of second fastening bolts 43. Herein, the number of the second fastening bolts 43 is set larger than the number of the first fastening bolts 36. The second internal gear member 34 is fixed to the flange part 23a of the output shaft 23 by six second fastening bolts 43 in the first embodiment. The fastening torque of the second internal gear member 34 relative to the flange part 23a of the output shaft 23 is also set higher than the fastening torque of the second internal gear member 34 relative to the motor cover 25.

Further, a thickness T1 of the motor cover 25 at a position where the first internal gear member 31 is fixed is set larger than a thickness T2 of the flange part 23a of the output shaft 23 to which the second internal gear member 34 is fixed. In other words, a rigidity of the motor cover 25 at a position where the first internal gear member 31 is fixed is made higher than a rigidity of the flange part 23a of the output shaft 23 to which the second internal gear member 34 is fixed.

The number of teeth of the first gear portion 37 of the external gear member 32 and the number of teeth of the fixed gear portion 35 of the first internal gear member 31 differ by two teeth so that the external gear member 32 and the first internal gear members 31 are rotated relative to each other by an amount corresponding to such a tooth number difference per one rotation of the wave generator 33. Furthermore, the number of teeth of the second gear portion 38 of the external gear member 32 and the number of teeth of the output-side gear portion 42 of the second internal gear member 34 differ by two teeth so that the external gear member 32 and the second internal gear member 34 are rotated relative to each other by an amount corresponding to such a tooth number difference per one rotation of the wave generator 33.

In the wave gear reducer 22 of the first embodiment, a ratio of the number of the teeth of the fixed gear portion 35 to the number of the teeth of the first gear portion 37 is set higher than a ratio of the number of the teeth of the output-side gear portion 42 to the number of the teeth of the second gear portion 38. In other words, the number of the teeth of the output-side gear portion 42 of the second internal gear member 34 is set larger than the number of the teeth of the fixed gear portion 35 of the first internal gear member 31.

The wave gear reducer 22 outputs, to the output shaft 23, a rotation speed difference between the rotation of the external gear member 32 caused by rotation of the wave generator 33 and the rotation of the second internal gear member 34 caused by rotation of the wave generator 33, and thus attains a high reduction ratio between the rotation shaft 39 of the electric motor 21 and the output shaft 23.

For example, the reduction ratio of the wave gear reducer 22 is about 300 in the case that: the number of the teeth of the fixed gear portion 35 of the first internal gear member 31 is set to 202; the number of the teeth of the output-side gear portion 42 of the second internal gear member 34 is set to 302; the number of the teeth of the first gear portion 37 of the external gear member 32 is set to 200; and the number of the teeth of the second gear portion 38 of the external gear member 32 is set to 300.

The reduction ratio of the wave gear reducer 22 can be controlled to e.g. about 200 to 400; and the numbers of the teeth of the first and second internal gear members 31 and 34 are not limited to the above.

In the above-structured variable compression ratio mechanism 5, the output shaft 23 is readily influenced by vibration of the control shaft 10 because the output shaft 23 is connected through the link member to the control shaft 10 on which a torque of the internal combustion engine 1 is exerted. The second internal gear member 34 fixed to the flange part 23a of the output shaft 23 is consequently influenced by vibration of the output shaft 23 (i.e. vibration of the output shaft 23 in a clearance inside the output shaft support bearing 28), radial misalignment of the output shaft 23, elastic deformation of the output shaft 23 etc. The teeth of the second internal gear member 34 are susceptible to breakage or surface wear when the engagement of the second internal gear member with the second gear portion 38 of the external gear member 32 becomes poor.

Accordingly, the variable compression ratio mechanism 5 of the first embodiment is configured such that the number of the teeth of the output-side gear portion 42 of the second internal gear member 34 is set larger than the number of the teeth of the fixed gear portion 35 of the first internal gear member 31 so as to increase the number of teeth in engagement between the output-side gear portion 42 of the second internal gear member 34 and the second gear portion 38 of the external gear member 32.

With this configuration, it is possible to reduce a load per gear tooth, distribute stress in the engagement part between the output-side gear portion 42 and the second gear portion 38 and suppress surface wear and breakage of the gear teeth caused by interference with the counterpart gear teeth.

The rigidity of the teeth of the output-side gear portion 42 of the second internal gear member 34 is relatively lowered when the number of the teeth of the output-side gear portion 42 becomes large. By making the rigidity of the flange part 23a low, the rigidity of the second internal gear member 34 fixed to the flange part 23a of the output shaft 23 is made relatively low. The second internal gear member 34, which is likely to result in poor gear engagement and cause an increase of local load on tooth surface, can be thus made relatively low in rigidity so that the output-side gear portion 42 of the second internal gear member 34 attains an increased gear engagement surface by elastic surface deformation of the gear teeth under the application of a large load and thereby allows a reduction of local load.

The control shaft 10 is susceptible to vibration and elastic deformation under the influence of combustion load. Poor gear engagement is hence more likely to occur at the engagement part between the output-side gear portion 42 of the second internal gear member 34 and the second gear portion 38 of the external gear member 32, which is relatively closer to the control shaft, than the engagement part between the fixed gear portion 35 of the first internal gear member 31 and the first gear portion 37 of the external gear member 32. Further, it is important to control the relative tooth numbers and rigidities of the motor cover-side gear member and the output shaft-side gear member depending on the degree of deterioration of the engagement state between these gear members for the purpose of improving the durability of the gear teeth (for protection of the gear teeth from breakage and wear).

By relatively thinning the flange part 23a of the output shaft 23 to which the second internal gear member 34 is fixed, the overhang amount of the flange part 23a from the output shaft support bearing 28 can be reduced so that it is possible to suppress a displacement of the second internal gear member 34 due to vibration of the output shaft in the clearance inside the output shaft support bearing 28 or radial misalignment of the output shaft 23 etc. and poor engagement between the output-side gear portion 42 of the second internal gear member 34 and the second gear portion 38 of the external gear member 32.

In the case that the second internal gear member 34 is directly fixed to an end portion of the control shaft 10, that is, the control shaft 10 also serves as the output shaft 23, the flange part to which the second internal gear member 34 is fixed is formed on the end portion of the control shaft 10. In this case, the overhang amount of the flange part 23a, i.e., the amount of protrusion of the flange part 23a from the control shaft end-side bearing on which the control shaft 10 is rotatably supported (between the crank bearing bracket 14 and the control shaft bearing bracket 18) can be reduced by thinning the flange part of the control shaft 10 to which the second internal gear member 34 is fixed.

It is conceivable to previously assemble the external gear member 32 to the first internal gear member 31 or the second internal gear member 34. In this case, the external gear member 32 and the internal gear member 31 or 34 as single elements can be easily aligned into proper engagement position and assembled to each other. In the subassembly state where the external gear member 32 has been assembled to one of the first and second internal gear members 31 and 34, however, it is not easy to assemble the other of the first and second internal gear members 31 and 34 to the external gear member 32.

The larger the number of the gear teeth, the more difficult it is to align and assemble the gear teeth, which results in a deterioration of the assembling workability between the external gear member 32, the first internal gear member 31 and the second internal gear member 34.

When the number of the teeth of the first internal gear member 31 is set smaller than the number of the teeth of the second internal gear member 34, the assembling operation of the external gear member 32 in the subassembly state can be relatively facilitated by assembling the external gear member 32 to the second internal gear member 34 and then to the first internal gear member 31 fixed to the motor cover 25.

Ratcheting, which causes engagement misalignment between the gear members, is more likely occur at the second internal gear member 34 because the second internal gear member 34 is relatively large in tooth number and small in tooth depth. Hence, the flange part 23a to which the second internal gear member 34 is fixed is made of iron; and the motor cover 25 to which the first internal gear member 31 is fixed is made of aluminum alloy. In other words, the side at which ratcheting is more likely to occur (that is, the second internal gear member side) is made lower in thermal expansion coefficient in the first embodiment.

It is possible by this thermal expansion control to suppress deformation of the engagement part between the output-side gear portion 42 of the second internal gear member 34 and the second gear portion 38 of the external gear member 32 and prevent the occurrence of the ratcheting. It is further possible to prevent the ratcheting torque from being lowered with decrease of the engagement height (depth) of the output-side gear portion 42 relative to the second gear portion 38 of the external gear member 32 due to expansion of the second internal gear member 34 through thermal expansion of the flange part 23a under high-temperature conditions. Herein, the term "ratcheting torque" refers to a torque at which ratcheting occurs in the engagement part between the gear portions.

By lowering the thermal expansion coefficient of the gear member whose teeth are large in number and relatively low in strength (that is, the second internal gear member side), there can be developed a difference in thermal expansion coefficient between the flange part 23a of the output shaft 23 and the second internal gear member 34 under high-temperature conditions so that it is possible to prevent poor gear engagement due to deformation of the engagement part between the output-side gear portion 42 of the second internal gear member 34 and the second gear portion 38 of the external gear member 32 and suppress breakage and wear of the gear teeth caused by local stress concentration.

Ratcheting is relatively less likely to occur at the first internal gear member 31 because the first internal gear member 33 are small in tooth number and relatively large in tooth depth. As the motor cover 25 to which the external gear member 25 is fixed is made of aluminum alloy high in thermal expansion coefficient, but light in weight, in the first embodiment, it is possible to achieve a reduction of weight while preventing lowering of the ratcheting torque.

The fastening toque between the second internal gear member 34 and the flange part 23a of the output shaft 23 is set higher than the fastening torque between the motor cover 25 and the first internal gear member 31 in the first embodiment. As the fastening torque of the second internal gear member 34, at which ratcheting is likely to occur, is set relatively high, deformation of the output-side gear portion 42 of the second internal gear member 34 can be suppressed. It is thus possible to not only increase the ratcheting torque but also suppress breakage and surface wear of the gear teeth caused by local stress concentration due to poor engagement between the output-side gear portion 42 of the second internal gear member 34 and the second gear portion 38 of the external gear member 32.

As the number of the first fastening bolts 36 by which the first internal gear member 31 is fixed to the motor cover 25 is set relatively small in the first embodiment, it is possible to ensure the arrangement space of the components of the electric motor 21 within the inside of the electric motor 21 for size/weight reduction of the electric motor 21.

On the other hand, it is possible to easily set the high fastening torque between the second internal gear member 34 and the flange part 23a of the output shaft 23 as the number of the second fastening bolts 43 by which the second internal gear member 34 is fixed to the flange part 23a of the output shaft 23 is set relatively large in the first embodiment.

Depending on the setting of the reduction ratio, the number of the teeth of the output-side gear portion 42 of the second internal gear member 34 may become too large. The depth of the teeth of the output-side gear portion 42 is made smaller by an amount the number of the teeth becomes large. This makes it likely that ratcheting will occur to cause engagement misalignment between the output-side gear portion 42 of the second internal gear member 34 and the second gear portion 38 of the external gear member 32. In such a case, it is feasible to increase the ratcheting torque and prevent the ratcheting by setting the rigidity of the flange part 23a of the output shaft 23 to which the second internal gear member 34 is fixed higher than the rigidity of the part of the motor cover 25 to which the first internal gear member 31 is fixed. For example, the thickness of the motor cover 25 at a position where the first internal gear member 31 is fixed is set larger than the thickness of the flange part 23a of the output shaft 23 at a position where the second internal gear member 34 is fixed.

In the case that the number of the teeth of the output-side gear portion 42 is set larger than the number of the teeth of the fixed gear portion 35 and, at the same time, the rigidity of the flange part 23a of the output shaft 23 is made higher than the rigidity of the motor cover 23 at a position where the first internal gear member 31 is fixed, it is disadvantageous in terms of the ratcheting. When the ratcheting torque is set sufficiently higher than the maximum load torque, however, there is no need to consider the ratcheting torque. It is enough to consider the surface durability (tooth bottom stress and tooth surface wear) of the gear teeth when there is no need to consider the ratcheting torque.

Figure 4:
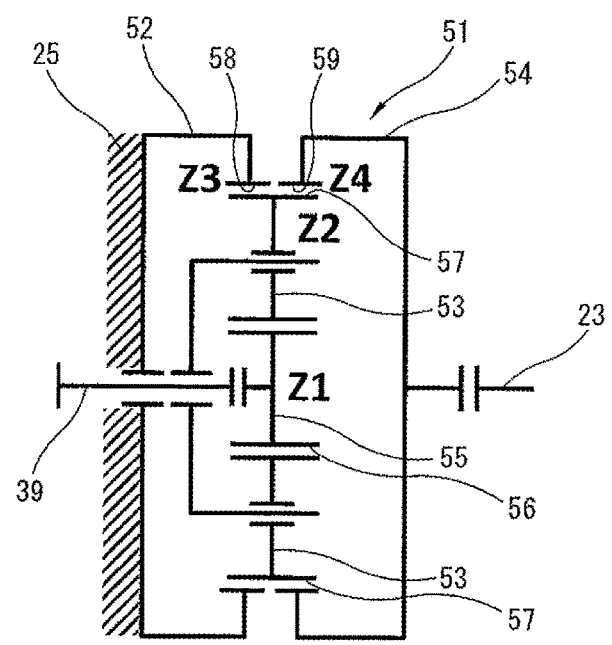
FIG. 4 is a schematic view of a gear reducer of the variable compression ratio mechanism according to a second embodiment of the present invention.
Figure 5:
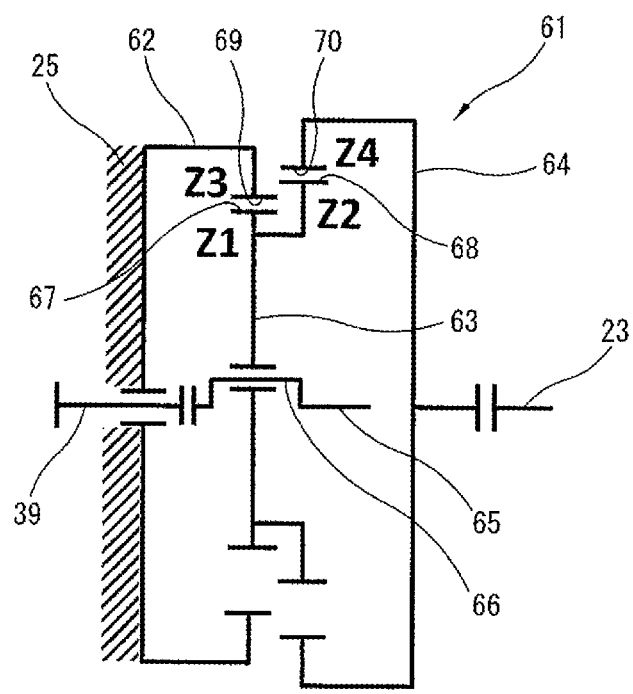
FIG. 5 is a schematic view of a gear reducer of the variable compression ratio mechanism according to a third embodiment of the present invention.

As the gear reducer for reducing the rotation of the electric motor 21, it is feasible to utilize any type of gear reducer other than the wave gear reducer 22. For example, a paradox planetary gear reducer 51 of FIG. 4 or a hypocycloid gear reducer 61 of FIG. 5 can be utilized as the gear reducer.

The following explanation will be given of a second embodiment of the present invention in which the paradox planetary gear reducer 51 is utilized as the gear reducer and of a third embodiment of the present invention in which the hypo-cycloid gear reducer 61 is utilized as the gear reducer. The second and third embodiments are structurally the same as the above-mentioned first embodiment, except for the configuration of the gear reducer.

In the second embodiment, the paradox planetary gear reducer 51 generally includes: a first internal gear member 52 as a fixed member made of iron and fixed to the motor cover 25; a plurality of planetary gear members 53 as an intermediate member made of iron; a second internal gear member 54 as an output-side member made of iron and fixed to the output shaft 23; and a sun gear member 55 as an input-side member made of iron and fixed to the rotation shaft 39 of the electric motor 21.

The sun gear member 55 has a sun gear portion 56 of tooth number Z1 on an outer circumferential side thereof, and is arranged inside the first internal gear member 52 and the second internal gear member 54. The first internal gear member 52 has a fixed gear portion 58 of tooth number Z3 on an inner circumferential side thereof. The second internal gear member 54 has an output-side gear portion 59 of tooth number Z4 on an inner circumferential side thereof. The planetary gear member 53 has a planetary gear portion 57 of tooth number Z2 on an outer circumferential side thereof, and is arranged between the first and second internal gear members 52 and 54 and the sun gear member 55.

The planetary gear portions 57 of the planetary gear members 53 are brought into engagement with the fixed gear portion 58 of the first internal gear member 52, the output-side gear portion 59 of the second internal gear member 54 and the sun gear portion 56 of the sun gear member 55. Namely, the planetary gear portions 57 correspond to the first and second gear portions of the intermediate member.

In this paradox planetary gear reducer 51, a ratio of the number of teeth of the fixed gear portion 58 to the number of teeth of the planetary gear portion 57 is set higher than a ratio of the number of teeth of the output-side gear portion 59 to the number of teeth of the planetary gear portion 57. In other words, the tooth number Z4 of the output-side gear portion 59 of the second internal gear member 54 is set larger than the tooth number Z3 of the fixed gear portion 58 of the first internal gear member 52.

Even by the use of such a paradox planetary gear reducer 51, it is possible to obtain substantially the same effects as those in the first embodiment.

In the paradox planetary gear reducer 51, the second internal gear member 54 is relatively large in tooth number and low in tooth strength so that there is a possibility of poor gear engagement by deformation of the gear teeth in the engagement part between the output-side gear portion 59 of the second internal gear member 54 and the planetary gear portion 57 of the planetary gear member 53. However, such poor gear engagement can be suppressed by making the rigidity of the second internal gear member 54 high. It is thus possible to suppress breakage and wear of the gear teeth caused by local stress concentration in the engagement part between the output-side gear portion 59 of the second internal gear member 54 and the planetary gear portion 57 of the planetary gear member 53.

In the third embodiment, the hypo-cycloid gear reducer 61 generally includes: a first internal gear member 62 as a fixed member made of iron and fixed to the motor cover 25; an external gear member 63 as an intermediate member made of iron; a second internal gear member 64 as an output-side member made of iron and fixed to the output shaft 23; and an input-side member 65 made of iron and fixed to the rotation shaft 30 of the electric motor 21.

The external gear member 63 has a first gear portion 67 of tooth number Z1 and a second gear portion 68 of tooth number Z2, and is rotatably supported on an eccentric shaft part 66 of the input-side member 65 that is offset relative to the rotation shaft 39 of the electric motor 21. The first internal gear member 62 has a fixed gear portion 69 of tooth number Z3 on an inner circumferential side thereof, and is arranged on an outer side of the first gear portion 67 of the external gear member 63. The second internal gear member 64 has an output-side gear portion 70 of tooth number Z4 on an inner circumferential side thereof, and is arranged on an outer side of the second gear portion 68 of the external gear member 63.

The first gear portion 67 of the external gear member 63 is brought into engagement with the fixed gear portion 69 of the first internal gear member 62. The second gear portion 68 of the external gear member 63 is brought into engagement with the output-side gear portion 70 of the second internal gear member 64.

As the external gear member 63 is offset relative to the rotation shaft 39 of the electric motor 21, the first gear portion 67 and the second gear portion 68 engage with the fixed gear portion 69 of the first internal gear member 62 and the output-side gear portion 70 of the second internal gear member 64, respectively, at an offset side of the external gear member 63 (on which the eccentric shaft part 66 is located) relative to the rotation shaft 39.

In this hypo-cycloid gear reducer 61, a ratio of the number of teeth of the fixed gear portion 69 to the number of teeth of the first gear portion 67 is set higher than a ratio of the number of teeth of the output-side gear portion 70 to the number of teeth of the second gear portion 68. In other words, the tooth number Z3 of the output-side gear portion 69 of the first internal gear member 62 is set smaller than the tooth number Z4 of the output-side gear portion 70 of the second internal gear member 64; and the tooth number Z1 of the first gear portion 67 of the external gear member 63 is set smaller than the tooth number Z2 of the second gear portion 68 of the external gear member 63.

Even by the use of such a hypo-cycloid gear reducer 61, it is possible to obtain substantially the same effects as those in the first embodiment.

In the hypo-cycloid gear reducer 61, the second internal gear member 64 is relatively large in tooth number and low in tooth strength so that there is a possibility of poor gear engagement by deformation of the gear teeth in the engagement part between the output-side gear portion 70 of the second internal gear member 64 and the second gear portion 68 of the external gear member 63. However, such poor gear engagement can be suppressed by making the rigidity of the second internal gear member 64 high. It is thus possible to suppress breakage and wear of the gear teeth caused by local stress concentration in the engagement part between the output-side gear portion 70 of the second internal gear member 64 and the second gear portion 68 of the external gear member 63.

The invention claimed is:

1. A variable compression ratio mechanism for an internal combustion engine, comprising a gear reducer configured to reduce and transmit rotation of an actuator as a drive torque to a control shaft to change a rotational position of the control shaft, thereby varying an engine compression ratio of the internal combustion engine,
    wherein the gear reducer comprises:
        an input-side member connected to a rotation shaft of the actuator;
        an output-side member configured to transmit a reduced rotation of the actuator to the control shaft;
        a fixed member fixed to a housing of the actuator; and
        an intermediate member configured to transmit torque from the input-side member to the output-side member and the fixed member,
    wherein the intermediate member has a first gear portion brought into engagement with a fixed gear portion of the fixed member and a second gear portion brought into engagement with an output-side gear portion of the output-side member,
    wherein a ratio of a number of teeth of the fixed gear portion to a number of teeth of the first gear portion is set higher than a ratio of a number of teeth of the output-side gear portion to a number of teeth of the second gear portion,
    wherein the number of the teeth of the first gear portion is different from the number of the teeth of the second gear portion,
    wherein the variable compression ratio mechanism further comprises an output shaft to which the output-side member is fixed such that the drive torque of the actuator is transmitted to the control shaft through the output shaft, and
    wherein a fastening torque between the output-side member and the output shaft is higher than a fastening torque between the housing and the fixed member.

2. The variable compression ratio mechanism for the internal combustion engine according to claim 1,
    wherein a rigidity of a flange part of the output shaft to which the output-side member is fixed is higher than a rigidity of the housing to which the fixed member is fixed.

3. The variable compression ratio mechanism for the internal combustion engine according to claim 1,
    wherein a thickness of the housing at a position where the fixed member is fixed is larger than a thickness of a flange part of the output shaft to which the output-side member is fixed.

4. The variable compression ratio mechanism for the internal combustion engine according to claim 1, wherein a thermal expansion coefficient of the output shaft to which the output-side member is fixed is lower than a thermal expansion coefficient of the housing to which the fixed member is fixed.

5. The variable compression ratio mechanism for the internal combustion engine according to claim 1,
wherein a number of bolts by which the output-side member is fixed to the output shaft is larger than a number of bolts by which the fixed member is fixed to the housing.

6. The variable compression ratio mechanism for the internal combustion engine according to claim 1,
wherein the number of the teeth of the output-side gear portion is larger than the number of the teeth of the fixed gear portion.

* * * * *